(No Model.) 2 Sheets—Sheet 1.
E. H. HEATH & F. W. MOORE.
MOWING MACHINE.
No. 328,028. Patented Oct. 13, 1885.
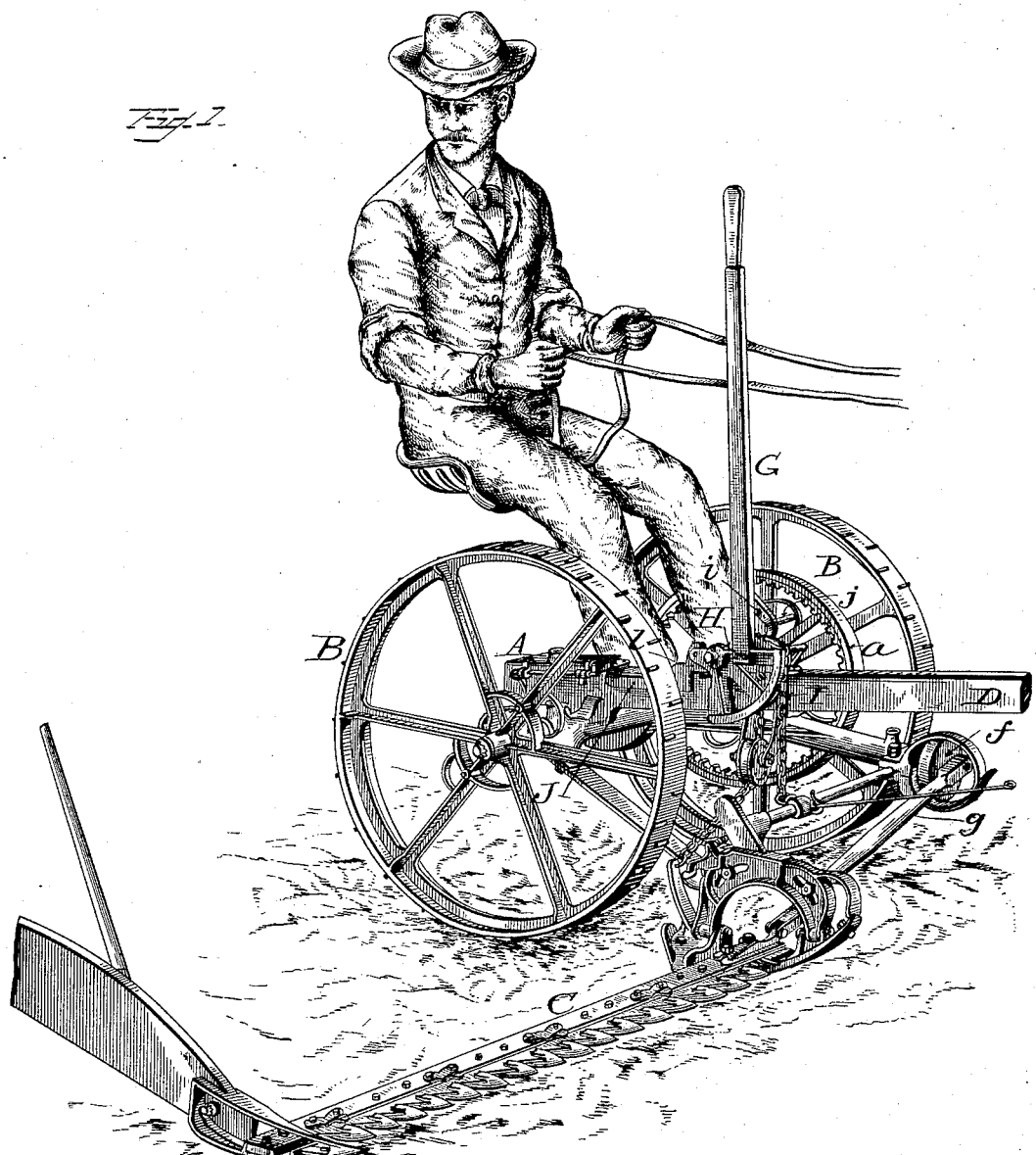
WITNESSES:
Franck L. Ourand
Walter J. Dodge
EDWARD H. HEATH,
FRANK W. MOORE,
INVENTORS.
by Dodge & Son,
Attorneys.

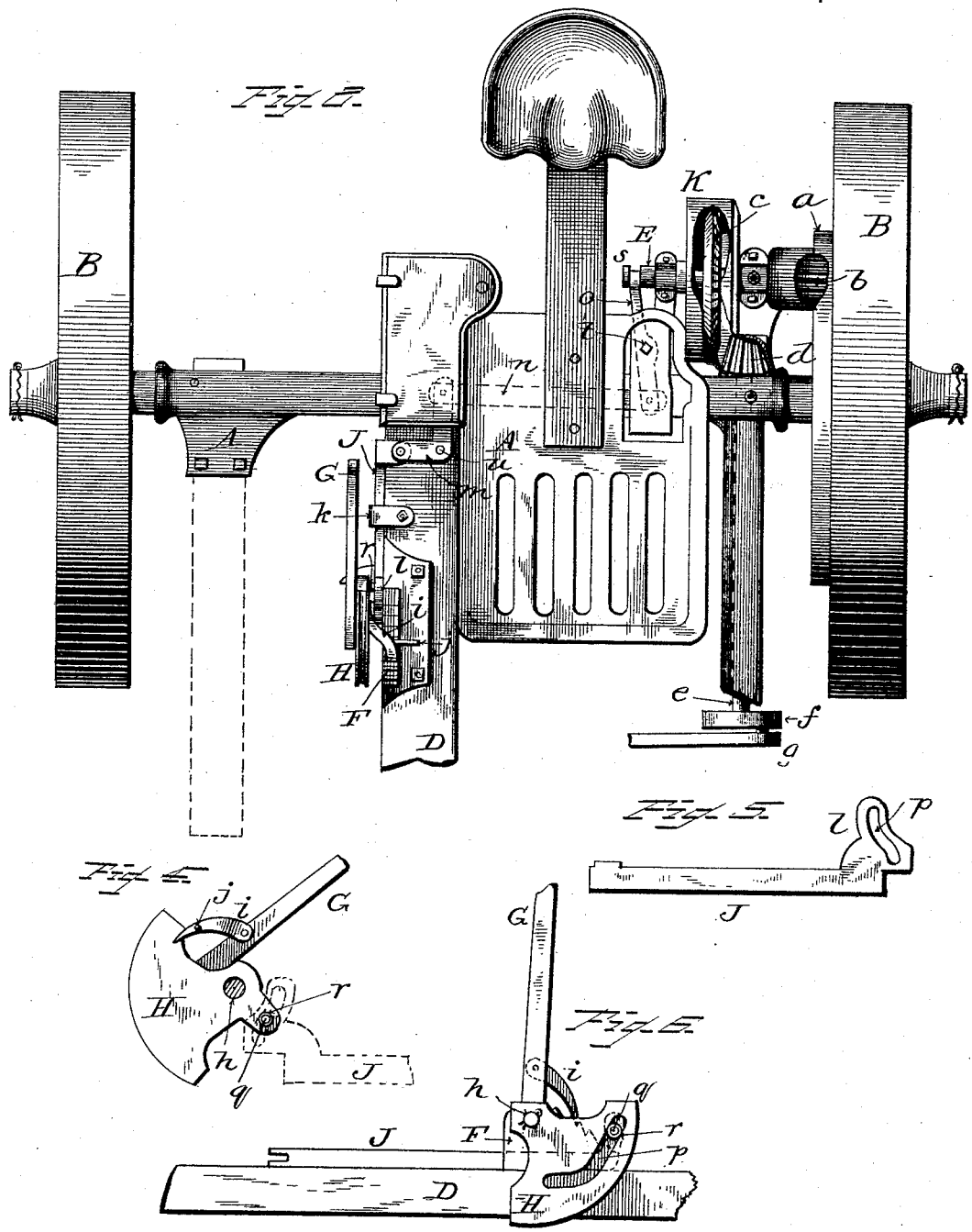

UNITED STATES PATENT OFFICE.

EDWARD H. HEATH AND FRANK W. MOORE, OF WAUPUN, WISCONSIN.

MOWING-MACHINE.

SPECIFICATION forming part of Letters Patent No. 328,028, dated October 13, 1885.

Application filed July 11, 1884. Serial No. 137,416. (No model.)

*To all whom it may concern:*

Be it known that we, EDWARD H. HEATH and FRANK W. MOORE, of Waupun, in the county of Fond du Lac and State of Wisconsin, have invented certain new and useful Improvements in Mowing-Machines, of which the following is a specification.

Our invention relates to reaping and mowing machines; and it consists in means for raising the cutter-bar and automatically disconnecting its operating mechanism when raised beyond a certain angle.

In the accompanying drawings, Figure 1 is a perspective view of a mowing-machine constructed in accordance with our invention; Fig. 2, a top plan view of the same; Figs. 3, 4, and 5, views illustrating details of construction, and Fig. 6 a modification.

In ordinary mowing-machines, as commonly constructed, a lever is employed for raising the cutter-bar when passing over a stone or other obstruction, or when passing by a tree, and a second lever is employed for disconnecting the operating mechanism of the cutters when a certain angle is reached. Such construction is objectionable, for the reason that it is almost impossible for the driver to manipulate both levers, so that the cutter-bar can be elevated and also disconnected from its operating mechanism, without stopping the advance of the machine, and the result is that the mechanism is quite frequently broken, as it cannot operate when the cutter-bar is raised above a certain line or angle.

Our invention allows the cutter-bar to be raised to a predetermined angle without disconnecting the cutter-bar from the driving mechanism, and by a further movement of the same lever used for raising the cutter-bar the operating mechanism is automatically disconnected, and all liability of breakage or injury is avoided.

We would state here that we are aware that it is not new to construct mowers in the manner just described, and hence make no broad claim thereto.

In the drawings, A indicates the main frame of a mowing-machine of common form carried by wheels B B, and provided with a cutter-bar, C, and tongue D, as is usual in this class of machines, and as these features form no part of the present invention their construction is immaterial and may be varied indefinitely; or, in other words, the invention may be applied, with slight modification of details, to all machines of this class.

Upon one of the driving-wheels B is a gear-wheel, a, which imparts motion to a gear, b, mounted on a shaft, E, in the main frame A, as shown in Fig. 2, said shaft E also carrying a second gear-wheel or pinion, c, somewhat larger than pinion b, and adapted to mesh with and give motion to a pinion, d, as clearly shown in Fig. 2. From pinion d motion is transmitted to the cutter-bar by means of shaft e, crank-wheel f, and pitman g, all of which parts are or may be of usual construction.

F indicates a curved rack mounted on the tongue D, and which has pivoted to it the hand-lever G, as shown in Figs. 1, 2, 3, 4, and 6, said lever being firmly bolted to a quadrant, H, pivoted to the tongue or frame, or to a casting secured thereon.

Arc or quadrant H is grooved, as shown in Figs. 1 and 2, to receive and seat a chain or band, I, which, as the lever is moved backward upon its pivot, winds upon the quadrant and raises the cutter-bar off the ground to any desired angle, as is well understood.

Lever G is provided with a pawl or dog, i, which engages with the rack F and holds the lever at any point to which it is moved by hand, said dog being provided with a foot piece or arm, j, by which to disengage the dog from the rack and allow the forward movement of the lever when necessary or desirable.

J indicates a sliding bar or rod carried in suitable hangers or guides, k, on the frame, said bar being provided at one end with an offset or upward extension, l, and connected at its other end to an elbow-lever, m, pivoted to frame A, as clearly shown in Fig. 2, the elbow-lever in turn being connected with a link or rod, n, attached to a pivoted arm or lever, o, the purpose of which will be presently explained. The forward end, l, of the rod or bar J is provided with a curved slot, p, as shown in Figs. 3, 4, and 5, into which projects a stud, q, provided with a roller, r, the stud being carried by the quadrant H.

Referring again to Fig. 2, it will be seen that the shaft E, on which the pinions b c are carried, is provided with a circumferentially-grooved collar, s, which receives the forked end of the lever o, and is adapted to be moved longitudinally through its boxes, so as to bring the pinion c into or out of engagement with pinion d, the pinion b being of such length that when the shaft is moved its greatest distance the pinion will remain in gear with the annular gear-ring a. The gearing b c d is inclosed within a casing, K, as is customary in this class of machines.

The lever o is pivoted at or about its center by a pivot-pin, t, and the elbow-lever m is likewise provided with a pivot-pin, u, at its corner where its two arms meet.

The mechanism being constructed as above described, the operation is as follows: When the machine is cutting in even ground, the parts occupy the relative position shown in Figs. 1 and 3—that is to say, the lever G is upright and the stud and roller are at the upper end of the curved slot in the movable rod or bar J, thus insuring the engagement of the gear-wheels c and d. If, however, an obstruction is met with, the hand-lever is thrown backward to the position indicated in Fig. 4, whereupon the cutter-bar will be elevated; but should it be found that this elevation is not sufficient to clear the obstacle, a further movement of the lever will raise the cutter-bar to a vertical or nearly vertical position. During the first part of the movement of the lever the stud q on the quadrant H traverses only the concentric portion of the slot p; but upon the further movement of the lever the stud enters the cam-shaped portion of the slot and causes the rod or bar J to move or slide forward. This moving or sliding of the bar J causes the elbow-lever to swing on its pivot u, and through the connecting-bar n to move the pivoted lever o upon its pivot t. The result of such movement is to shift the shaft E longitudinally in its bearings, and thereby disconnecting pinions c and d and stopping the operation of the cutting-fingers, and thus avoiding all liablity of becoming broken.

It is obvious that instead of having the slot in the end of the rod or bar J it may be in the quadrant H, and the bar J provided with the stud, as shown in Fig. 6.

Having thus described our invention, what we claim is—

1. In a reaper, mower, or like machine, the combination of a cutter-bar, C, lifting-lever G, provided with quadrant H, shifting-pinion c, serving to transmit motion from the driving-wheel to the cutter-bar, shifting-lever o, and sliding bar J, connected with the shifting-lever o and extending to the quadrant H, said bar and quadrant being provided one with a cam-slot and the other with a stud or pin to enter said slot, substantially as described, and for the purpose set forth.

2. In combination with frame A, wheels B B, cutter and cutter-bar C, and gearing, substantially as shown, for transmitting motion from one of the wheels B to the cutter, shifting-gear included in said gearing, shifting-lever o, link n, elbow-lever u, sliding bar J, and lifting-lever G, provided with quadrant H, the sliding bar and quadrant being connected by a stud or pin on one of said parts projecting into a slot in the other concentric with the quadrant through a part of its length and eccentric thereto through another portion of its length, as and for the purpose set forth.

EDWARD H. HEATH.
FRANK W. MOORE.

Witnesses:
W. H. TAYLOR,
SIMON SHEATH.